Figure 1:
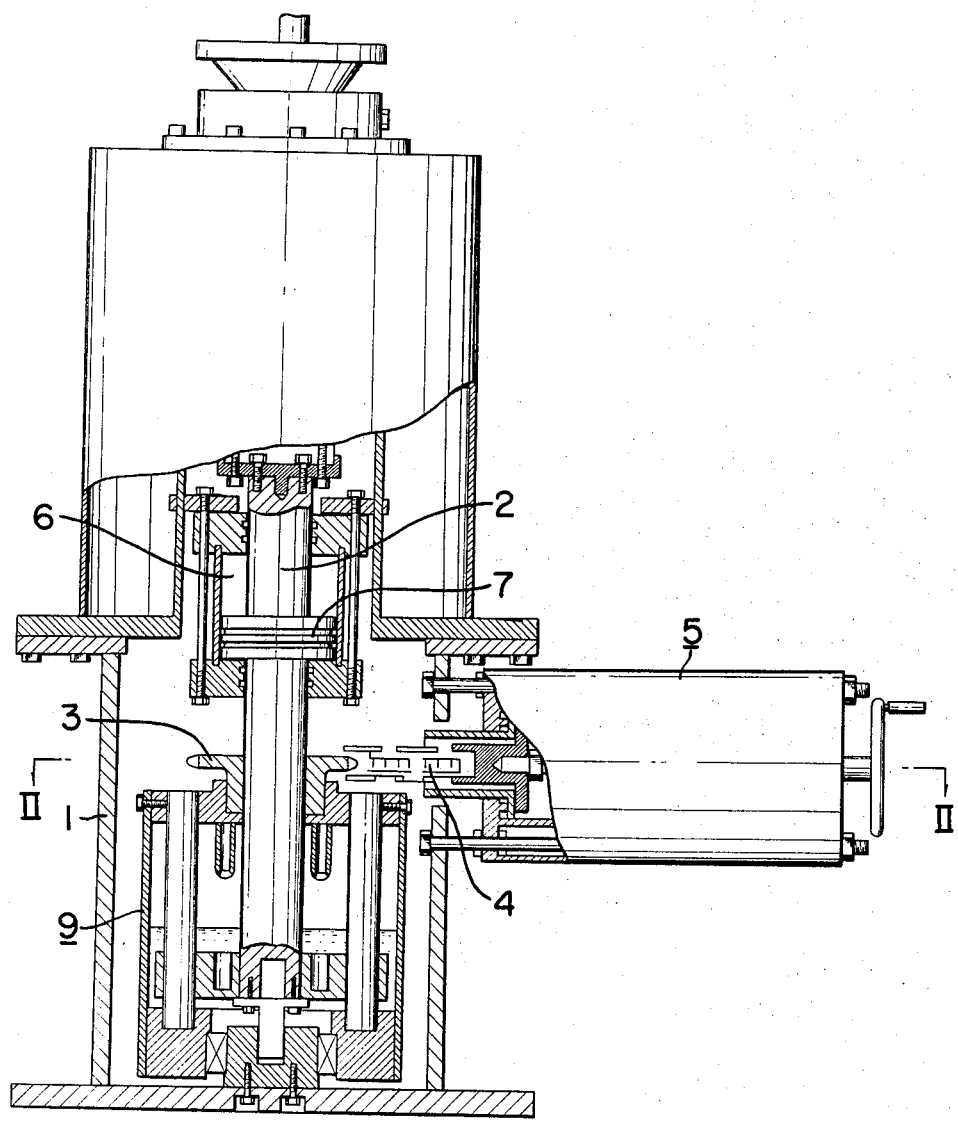

United States Patent [19]
Fujiwara et al.

[11] 3,823,800
[45] July 16, 1974

[54] BUFFER DEVICE USED FOR INDUSTRIAL ROBOT MACHINE

[75] Inventors: Hisao Fujiwara; Kentaro Sakamoto, both of Yokohama, Japan

[73] Assignee: Kabushiki Kaisha Keiaisha Seisakusho, Yokohama-shi, Kawagawa-ken, Japan

[22] Filed: Dec. 26, 1972

[21] Appl. No.: 318,275

[30] Foreign Application Priority Data
Dec. 27, 1971 Japan.............................. 46-105273

[52] U.S. Cl.................................. 188/303, 92/137
[51] Int. Cl............................................. F16f 9/28
[58] Field of Search ........... 188/302, 303, 304, 286; 92/137

[56] References Cited
UNITED STATES PATENTS

| | | | |
|---|---|---|---|
| 2,098,501 | 11/1937 | Lasier | 188/303 X |
| 3,464,317 | 9/1969 | Woodward | 92/137 X |
| 3,729,073 | 4/1973 | Fujiwara | 188/303 |

FOREIGN PATENTS OR APPLICATIONS

| | | | |
|---|---|---|---|
| 567,206 | 12/1958 | Canada | 188/303 |
| 395,065 | 7/1933 | Great Britain | 188/303 |

*Primary Examiner*—George E. A. Halvosa
*Attorney, Agent, or Firm*—Larson, Taylor and Hinds

[57] ABSTRACT

This invention relates to a buffer device used for an industrial robot machine, which comprises a chain which is wound onto the rotational shaft of a robot, and connected at its ends with the two piston rods of hydraulic cylinders via stop members provided at ends of said piston rods which engage with the pistons slidable in the two buffer cylinders. The airtight chambers which are formed in said cylinders are connected to each other by means of two tubes having sliding valves operable in opposite directions, said valves adapted to open and close said airtight chambers by the pistons, whereby the movement rate of the pistons may be restricted for buffering according to the change in flow quantity of the oil which flows in and out, due to the change of spaces of the openings when opening and closing.

4 Claims, 2 Drawing Figures

BUFFER DEVICE USED FOR INDUSTRIAL ROBOT MACHINE

The present invention relates to a robot machine for industries and, more particularly to a buffer device for the robot machine for controlling rotational movement of the robot shaft.

Recently, the so-called robots for industries have been generally employed for the transfer of a manufactured articles or work pieces from one step to the other during operation in such places as press mill and the other. The robot for industries of the kind as described above usually comprises an arm rod swingable on a pivot of a rotational shaft and is provided with a holder means at the end of said arm rod, the swinging movement of the arm, upward and downward movement of the shaft, and opening and closing operation of the holder means being carried out by means of hydraulic pressure device or electric motor, whereby the operation of the robot can be repeated in the order and amount of motion according to the program as predetermined.

In the beginning or at the end of a certain movement, however, the robot machine often exhibits awkwardness in respect to the operation of the holder arm due to inertia and by weight of an article which is withheld and carried by the arm. In particular, the drawback is found when the arm rod of the robot is not capable of stopping at a correct position as desired, and to eliminate this drawback there have been proposed various countermoves.

The invention described in commonly owned U.S. Pat. No. 3,729,073, issued Apr. 24, 1973 is an invention in the same category. However, due to the valve bodies provided in cylinder it has been difficult to manufacture the buffer device, it has been expensive to maintain a higher degree of precision, and further there has been a trouble to assemble and conserve the buffer device.

The present invention is intended to remove the above drawbacks and has for its object to provide a suitable buffer means for smoothly and accurately avoiding the shock caused by the inertia at both the ends of its swing motion.

In accordance with the invention, two piston rods of hydraulic pressure cylinder are respectively connected to the ends of a chain, winding around a chain wheel secured on a main shaft in order to rotate said shaft, the free ends of said rods pass through the two pistons which pistons sliding in two cylinders secured on the machine frame in a manner that the position of said cylinders relative to said frame are changeable and forming the ring-form airtight chambers between said pistons and inner walls of said cylinders respectively, and said rods are engaged with the ends of pistons, and the two cylinders are respectively provided with an opening which is closed by piston at the final step of the pistons, through which openings said airtight chambers are connected air-tightly by two tubes, each connecting tube being provided with sliding valve which is mounted on each piston.

As the present invention is constituted as above-mentioned, when one of said hydraulic pressure means is operated and the chain is pulled to said hydraulic pressure means, the other piston rod moves the piston sliding in the cylinder for buffering in the direction to the end of said cylinder compressing the oil in said chamber, so that said oil runs at one side only to be transferred into the other chamber and then expands the volume of said chamber. In one view, upon reaching the termination of pulling operation, the piston gradually closes said connecting opening, and after this moment, said airtight chamber is intercepted from the other chamber. During the movement of the piston rods the connecting opening is gradually closed to reduce forcibly the amount of the oil running into one chamber, whereby increasing the resistance imposed on the piston rods to effect a smooth buffer action just before a mechanical piston stroke is stopped. Accordingly, even the shape of the connecting opening itself largely influences upon the buffer effect.

Figure 2:
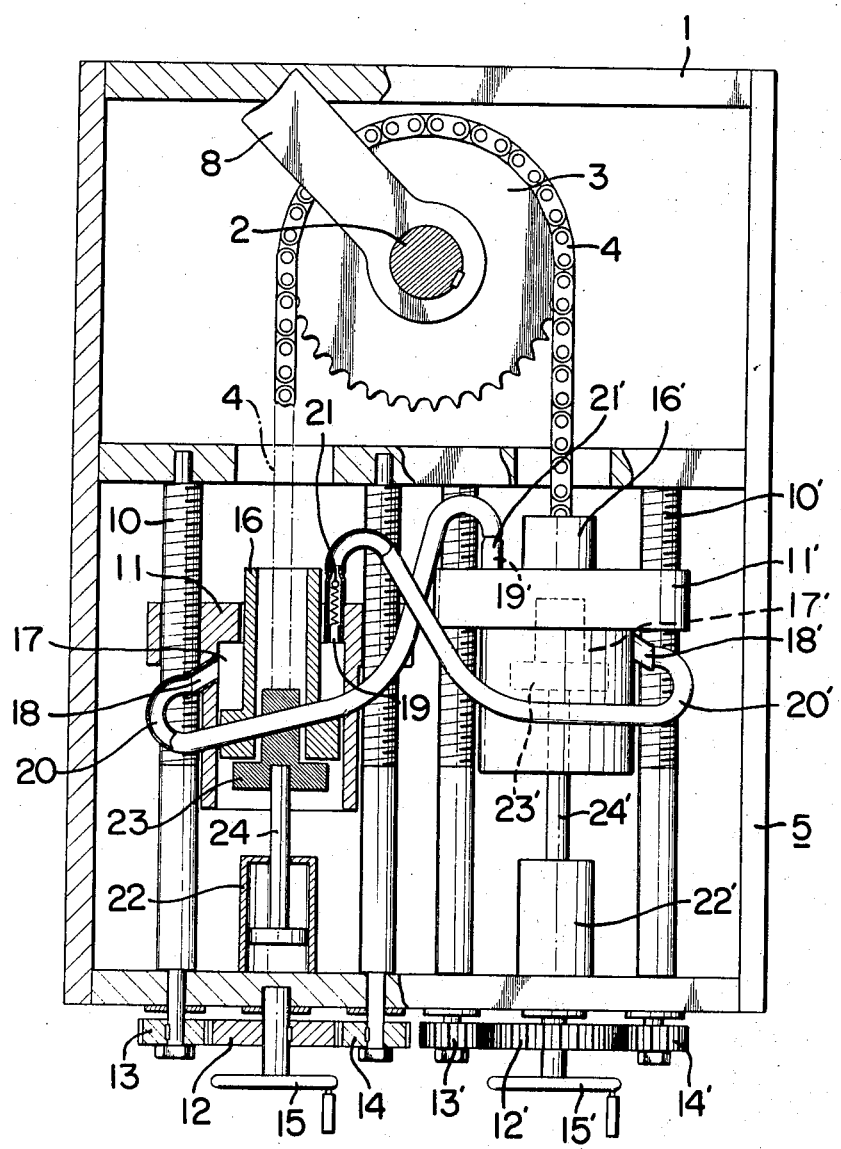

The invention will now be illustrated by way of example on an embodiment with reference to the accompanying drawings, in which:

FIG. 1 is a cross section of an essential portion of an industrial robot machine provided with a buffer device according to the invention; and FIG. 2 is a view illustrating the buffer device.

Referring now the drawings, essencially FIG. 1, a machine frame 1 is shown having a main shaft 2 which is rotatable and slidable upwardly and downwardly. The rotation of the main shaft 2 is effected by the chain wheel 3 capable of moving by means of a key so that the main shaft can slide upwardly and downwardly through the boss of said chain wheel but cannot relatively rotate in it. The both ends of the chain 4 winding about the chain wheel 3 are secured to stop members in the apparatus being generally denoted with reference 5, and which will be described in detail below. When the chain is pulled around by one of the air cylinders, the main shaft rotates without regard to its position either in the upward or downward direction.

The main shaft 2 thus can move upwardly or downwardly without relation to the position of rotation, provided that the air pressure is applied to either of the chambers of the cylinder 6 surrounding the piston part 7 which is integral with said main shaft 2.

Though not shown, the robot arm 8 is provided transversely at the top end of the main shaft. The robot arm has a holding means provided at the forward end thereof. The operation device for the holding means is provided inside the robot arm.

The apparatus being denoted in general with 9 is a buffer device for up and down motion of said main shaft 2, which does not be described in detail, as it is not indispensible for the construction of the present invention.

Referring now to FIG. 2 which is a plan view of the buffer device in the rotation of a main shaft 2, four screw rods 10, 10' are mounted onto a machine frame 5 and two cylinders 11, 11' are provided, respectively, on the screw rods 10, 10'. These cylinders 11, 11' are moved upwards and downwards by means of screw rods 10, 10' through the transmission of gears 12, 13, 14 or 12', 13', 14' by rotating handles 15, 15' to institute a revolution angle and mounted adequately in positions. Pistons 16, 16' which are of hollow cylindrical construction and have at their lower positions flanges, are fitted slidably respectively into the cylinders 11, 11' thereby forming ring-shaped airtight chambers 17, 17' with their flanges. Airtight chambers 17, 17' are respectively included with an oil and provided with openings 18, 19, 18', 19' the openings 19, 19' being provided with non-return valves 21, 21' at flexible pipes 20, 20'. When a chain 4 is pulled by means of the piston rod in a hydraulic cylinder 22', the piston 16 draws near the end of the cylinder 11 to close gradually said opening 18 by the piston 16, and the oil in the airtight chamber 17 flows into the airtight chamber 17' through the pipe 20 (no flow is made through the pipe 20' because of the operation of the non-return valve 21') to move the piston 16' downwards. In the case when the piston 16' moves upwards, the oil in the airtight chamber 17' flows into the airtight chamber 17 through the pipe 20' (no flow takes place through the pipe 20 because of non-return valve 21) to withdraw the piston 16. The oil in both the ring-shaped chambers 17, 17' and the flexible pipes 20, 20' is completely intercepted from the outside and can be retained in an oil quantity as predetermined.

The ends of chain 4 are secured respectively at ends to stop members 23, 23', and the piston rods 24, 24' of said cylinders 22, 22' are fixed at other ends to these members, said stop members consisting of cylindrical bodies of smaller diameter with flange parts of larger diameter. Said chain for and the cylindrical body of the stop members 23, 23', pass through the central bores of said pistons 16, 16', and the flanges of the stop member ends are engaged with the circumferential edges of the central bores of said pistons 16, 16' so that the stop members are stopped through an engagement with the pistons.

In operation, the cylinders 11, 11' may be fixed in position by the handles 15, 15', so that the chain 4 can be fully extended and placed in position. In consequence, the airtight chambers 17, 17' are communicated to each other. An operation will then be effected so as to pull off the piston from either one of the hydraulic pressure means 5. Therefore, the stop member 23 tends to disengage from the piston 16 and the oil in the airtight chamber 17' is conducted into the airtight chamber 17. On the other hand, the stop member 23' compresses the piston 16' reducing the space of the airtight chamber 17'. With decrease of the space in said chamber 17', the oil therein is delivered into the enlarging airtight chamber 17. The quantity of the delivering oil decreases with the gradually reducing space of the openings by said pistons, whereby a resistance for piston movement is enhanced so as to bring about a buffer effect.

The above described mechanism is applicable to any device which can fully comply with the object of the invention as hereinabove described.

It is most advantageous for use in the rotary movement particularly of the industrial robot machine, in which shock for the arm member of the robot in rotation can be steadily absorbed without failure.

What we claim is:

1. A buffer device for use with an industrial robot machine comprising:

a rotational shaft, a chain means drivingly engaged with said shaft for turning the shaft in either direction, a pair of hydraulic piston and cylinder units, one operably connected to each end of the chain means, said piston and cylinder units being operable for moving the chain means in either direction, a pair of stop members fixed on the chain means, one fixed between the shaft and one piston and cylinder unit, and the other fixed on the chain means between the shaft and the other piston and cylinder unit, a variable size chamber hydraulic cylinder adjacent each said stop member an positioned to be closed to a minimum size by movement of the chain means in one direction, a rigid stop means being provided to prevent movement of the chain means when the hydraulic cylinder chamber reaches the said minimum size, the hydraulic cylinder and stop means being so positioned that upon movement of the chain means in one direction, one hydraulic cylinder chamber is reduced to its minimum size by the action of its respective stop member thereon, and upon movement of the chain means in the other direction, the other hydraulic cylinder chamber is reduced to its minimum size by the action of its respective stop members, each hydraulic cylinder being movable longitudinally of its axis to vary its position relative to its respective stop member and to the other hydraulic cylinder, a pair of fluid lines interconnecting said hydraulic cylinder chambers, a non-return valve in each of said fluid lines, one valve permitting flow from one of said hydraulic cylinders to the other, and the other non-return valve permitting flow of fluid from the other hydraulic cylinder to the said one hydraulic cylinder, a fixed volume of fluid being present overall in the two hydraulic cylinders and the connecting fluid lines, each said fluid line having a first opening into the chamber from which it permits flow at a location along the side of the cylinder at points which are exposed to that chamber at least when that chamber is larger than its said minimum size, and a second opening into the other chamber at a location which at no time is covered by the side of the piston in said other chamber, the piston of each cylinder cooperating with the first tube opening of its respective cylinder to gradually close the same as it moves to reduce the size of the cylinder chamber and hence gradually reduces the amount of fluid entering the first opening and flowing to the other cylinder, thus increasing the resistance imposed on that piston rod to effect a smooth buffer action just before the piston stroke is terminated.

2. A device according to claim 1, said shaft including means for moving it along its axis, and means connecting the chain means to the shaft for turning the same regardless of the axial position of the shaft relative to the chain means.

3. A device according to claim 1, said stop members including flanged portions, said hydraulic cylinders including an outer cylindrical member fixed in place during operation, and an inner piston member, an axial opening through the inner piston member, said endless chain passing through this opening and the stop member engaging one end thereof, said chamber being an annular chamber formed between the outer cylinder and the inner piston members.

4. A device according to claim 3, said rigid stops constituted by axial engagement of the inner piston member with the outer cylindrical member.

* * * * *